Patented May 6, 1952

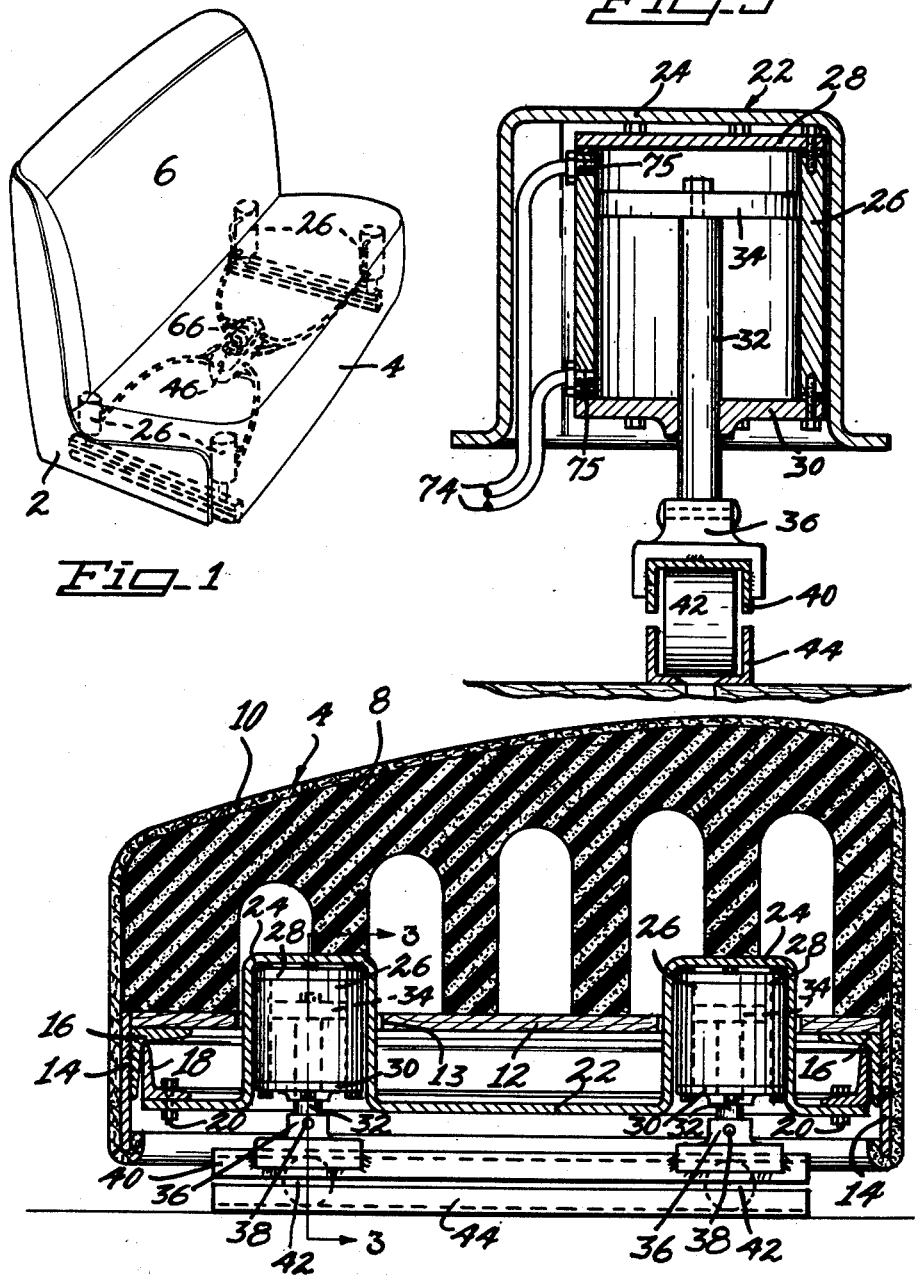

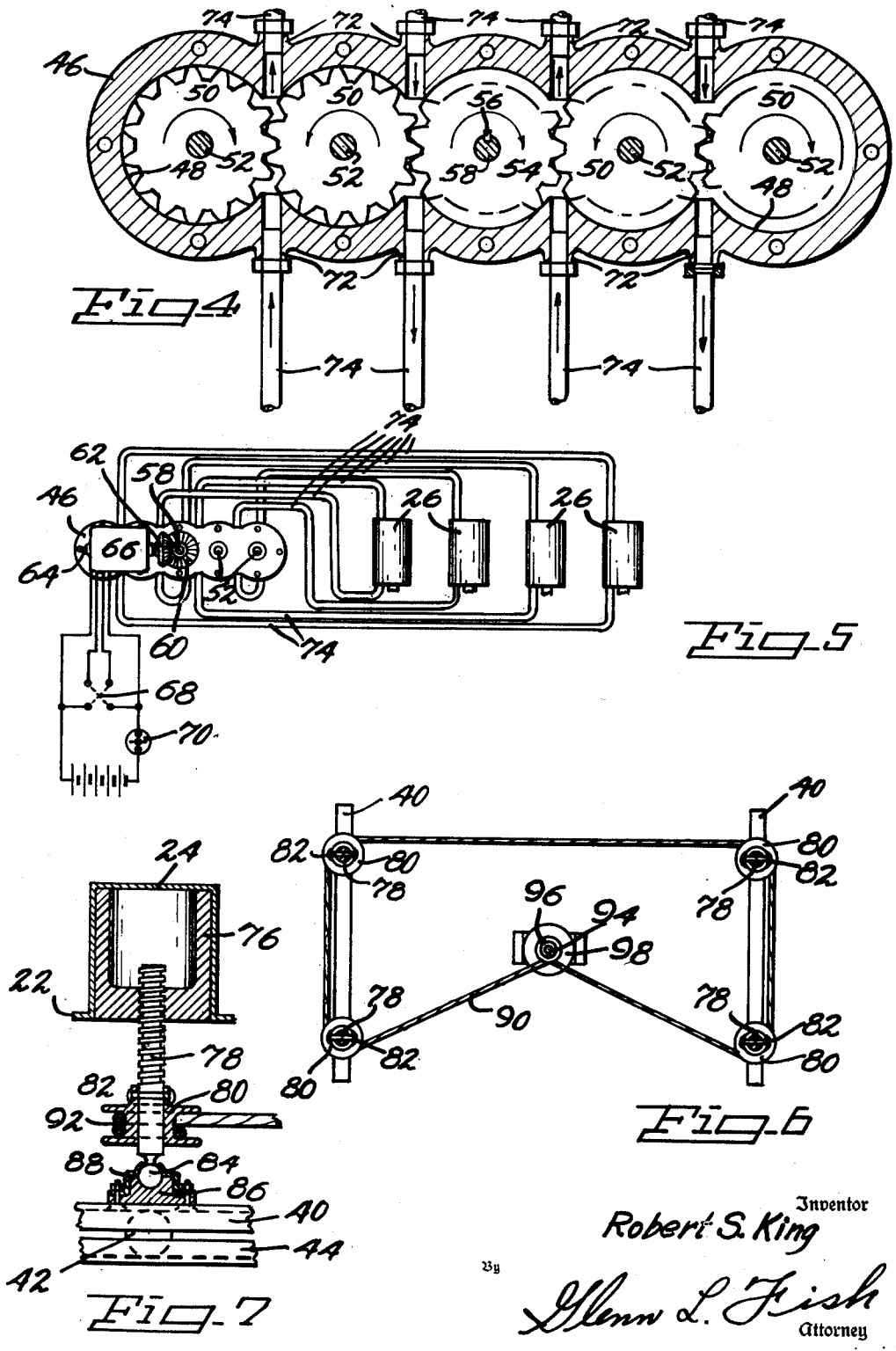

2,596,033

UNITED STATES PATENT OFFICE 2,596,033

ADJUSTABLE AUTOMOBILE SEAT

Robert S. King, Bonners Ferry, Idaho

Application August 15, 1949, Serial No. 110,394

6 Claims. (Cl. 155—88)

My present invention relates to an improved adjustable automobile seat of the type adapted to be vertically raised or lowered by mechanical power to the height best suited to the operator.

According to my invention the mechanical power is applied equally at a plurality of points under the seat so that the seat will be uniformly raised or lowered. An electric motor of the reversing type is employed as the primary power source, and alternate means for actually lifting or lowering the seat are shown including hydraulic and screw jack appliance.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a perspective view of the seat according to my invention showing parts of the adjusting means in dotted lines.

Fig. 2 is a transverse vertical sectional view through the seat.

Fig. 3 is a sectional view at line 3—3 of Fig. 2.

Fig. 4 is a sectional view of the gear pump.

Fig. 5 is a schematic view of the operating means.

Fig. 6 is a top plan view of a modified power means.

Fig. 7 is an enlarged vertical sectional view of one screw jack elevator.

Referring now to the drawings wherein I have illustrated the present preferred embodiment of my invention, I use a seat frame 2 for the removable seat 4 and to which the back rest 6 is secured.

The seat comprises a rubber cushion 8 having conventional upholstery 10 and rests upon a flat plate 12 formed with holes 13 therethrough. A frame 14 is secured to an angle support 16 which also supports the plate 12.

A second angle support 18 carries the support 16, and is bolted at 20 to a pressed metal plate 22 having spaced inverted wells 24 extending up through the holes 13. Cylinders 26 are located within the wells and have upper heads 28 and lower heads 30 and contain piston rods 32 and piston heads 34. The outer ends of the piston rods have feet 36 secured by pins 38 and are secured to the upper guide tracks 40 supported on rollers 42 and fixed tracks 44 to provide for forward or rearward adjustment of the seat under control of conventional mechanism, not shown.

Located under the seat, I use a gear case 46 having arcuate inner walls 48 forming communicating chambers for the gears 50 on shafts 52, and driven gear 54 keyed at 56 on shaft 58 and comprising a gear pump.

A beveled gear 60 on shaft 58 is engaged by a beveled gear 62 on shaft 64 which is driven by a reversing electric motor 66 having in its circuit a reversing switch 68 and an on and off switch 70.

Drilled bosses 72 on the gear case between each chamber receive the pipes 74 which connect as at 75 with the cylinder at opposite sides of the piston head and as indicated by the arrows in Fig. 4 operation of the gear train in one direction will force the cylinder up with relation to the fixed piston head, and in the other direction down to raise or lower the seat.

In Figs. 6 and 7 I have shown a modified form of my invention wherein a cylinder casting 76 is located in the well 24 and is threaded to receive a screw 78 which has a sheave 80 secured thereon by pin 82 and the lower end of the screw terminates in a ball 84 seated in bearing block 86 and secured by cap 88. A cable 90 has a bight 92 about each sheave 80 and is driven by sheave 94 on shaft 96 which has a motor 98 driven as described above with relation to motor 66. Rotation of shaft 96 will move the cable and simultaneously rotate the screws 78 to raise or lower the castings 76 and the seat.

Having thus fully described my invention what I claim as new and desire to secure by Letters Patent is:

1. An automobile seat having a flat plate thereunder, coacting angle frame supports supporting the seat plate, and a supporting plate carrying the frame supports, inverted wells in the latter plate, cylinders in the wells, and means supporting the cylinders and adapted to raise or lower the cylinders to effect vertical adjustment of the seat.

2. An automobile seat having a flat plate thereunder, coacting separable angle frame supports supporting the seat plate, and a supporting plate carrying the frame supports, inverted wells in the latter plate, cylinders in the wells, and means supporting the cylinders and adapted to raise or lower the cylinders to effect vertical adjustment of the seat.

3. An automobile seat having a flat plate thereunder, coacting angle frame supports supporting the seat plate, and a supporting plate carrying the frame supports, inverted wells in the latter plate, cylinders in the wells, and means including cable rotated screws in the cylinders to raise or lower the cylinders to effect vertical adjustment of the seat.

4. An automobile seat having a supporting plate, an angle support on the plate, inverted wells in the plate, cylinders in the wells, and means supporting the cylinders and adapted to raise or lower the cylinders to effect vertical adjustment of the seat.

5. An automobile seat having a flat plate thereunder, coacting supports supporting said plate, a supporting plate carrying said supports, inverted wells in the latter plate, cylinders in the wells, and means supporting the cylinders and adapted to raise or lower the cylinders to effect vertical adjustment of the seat.

6. An automobile seat having a flat plate thereunder, a supporting plate supporting the flat plate, inverted wells in the supporting plate, cylinders in the wells, and means carrying the cylinders and adapted to raise or lower the cylinders to effect vertical adjustment of the seat.

ROBERT S. KING.

REFERENCES CITED

The following references are of record in the file of this patent:

UNITED STATES PATENTS

| Number | Name | Date |
|---|---|---|
| 1,104,390 | Stanley | July 21, 1914 |
| 2,063,122 | Richardson | Dec. 8, 1936 |
| 2,270,233 | Shaw | Jan. 20, 1942 |
| 2,510,517 | Osinski | June 6, 1950 |

FOREIGN PATENTS

| Number | Country | Date |
|---|---|---|
| 51,276 | Denmark | Feb. 5, 1936 |